United States Patent [19]
Klingler et al.

[11] Patent Number: 5,404,316
[45] Date of Patent: Apr. 4, 1995

[54] DESKTOP DIGITAL VIDEO PROCESSING SYSTEM

[75] Inventors: Joseph W. Klingler; Lee T. Andrews; Clifton L. Vaughan, all of Toledo, Ohio

[73] Assignee: Spectra Group Ltd., Inc., Maumee, Ohio

[21] Appl. No.: 924,714

[22] Filed: Aug. 3, 1992

[51] Int. Cl.6 ............................................. G06K 15/00
[52] U.S. Cl. ..................... 364/514; 395/118; 395/161
[58] Field of Search ............... 364/514; 358/310, 311; 395/100, 114, 116–118, 153–157, 159, 161

[56] References Cited

U.S. PATENT DOCUMENTS

| | | |
|---|---|---|
| 3,617,626 | 11/1971 | Bluth ................................. 358/311 |
| 4,538,188 | 8/1985 | Barker et al. . |
| 4,635,136 | 1/1987 | Ciampa et al. . |
| 4,660,101 | 4/1987 | Martin . |
| 4,675,755 | 6/1987 | Baumeister et al. . |
| 4,685,003 | 8/1987 | Westland . |
| 4,717,971 | 1/1988 | Sawyer . |
| 4,729,044 | 3/1988 | Kiesel . |
| 4,873,585 | 10/1989 | Blanton et al. . |
| 4,937,685 | 6/1990 | Barker et al. . |
| 4,939,594 | 6/1990 | Moxon et al. . |
| 4,943,866 | 6/1990 | Barker et al. . |
| 4,949,187 | 8/1990 | Cohen . |
| 4,949,193 | 8/1990 | Kiesel . |
| 4,964,004 | 10/1990 | Barker . |
| 4,979,050 | 12/1990 | Westland . |
| 5,012,334 | 4/1991 | Etra . |
| 5,119,474 | 6/1992 | Beitel et al. ....................... 395/154 |
| 5,191,645 | 3/1993 | Carlucci et al. ................... 395/159 |

OTHER PUBLICATIONS

Adobe Premier product circular, printed Oct. 1991.
DiVa VideoShop product circular May 1992.
Digital Equipment Corp. Advanced Visualization System (AVS) User's Guide, May, 1992, cover page, and pp. 1–5, 1–6, 1–7, 1–8, 1–9, 1–10, 1–11 and 1–12.
Animation Production Environment (apE) Version 2.0 User's Manual, copyright 1990, Ohio State University, title page and pp. 8–9.
D. Ingalls et al. "Fabrik: a visual programming environment," in OOPSLA '88 Conf. Proc., pp. 176–190 (1988).
P. E. Haeberli, "ConMan: a visual programming language for interactive graphics," SIGGRAPH '88 Conf. Proc., Comput. Graph. 22(4) pp. 103–111 (1988).
M. P. Stovsky et al., "Building interprocess communication models using STILE," in Proc. Hawaii Int. Conf. Systems Sciences, vol. 2, 639–647, IEEE (1988).

Primary Examiner—Emanuel T. Voeltz
Assistant Examiner—Edward Pipala
Attorney, Agent, or Firm—Brooks & Kushman

[57] ABSTRACT

A digital image processing system including a microprocessor, random access memory, storage memory, input means, display means, and suitable logic to provide existing digital image processing operations in a conventional graphical user interface, such as a windows environment, which allows the user to implement image processing operations on a selected portion of a movie without utilizing a primitive special programming language.

16 Claims, 13 Drawing Sheets

DESKTOP DIGITAL VIDEO PROCESSING SYSTEM

TECHNICAL FIELD

This invention relates generally to digital video image processing and, more particularly, to a system including an improved user interface for performing digital video image processing operations in real time on a general purpose desktop computer.

BACKGROUND ART

Digital image processing has been in use for many years for applications ranging from satellite imagery to machine vision. A variety of digital image processing techniques, such as compression, warping, mathematical morphology, and other image combining operations have been implemented in the digital domain. These implementations, however, are often accomplished through the use of complex special purpose high speed digital hardware and/or machine specific software that operates, and must be programmed, at a primitive level.

It is, therefore, an object of the present invention to create a digital image processing system which utilizes a general purpose desktop computer.

It is another object of the present invention to provide a video digital image processing system including an interface which allows the user to employ complex image processing techniques to create and modify video movies in a conventional desktop user environment.

It is yet another object of the present invention to provide a digital video processing system which automatically records the processing operations selected to perform a particular video edit, so that variations in the editing process can be accomplished by recalling the original editing operations and reprocessing only those portions of the editing operations necessary to achieve a different desired result.

It is yet another object of the present invention to provide a digital video processing system which automatically records the processing operation selected to perform a particular video edit, so that a movie can be edited in draft quality and, when completed, completely reprocessed (on the system of the present invention or on a remote system) using higher resolution data.

It is yet another object of the present invention to provide a video digital image processing system including an interface which allows for simple yet complete rotation, perspective and zooming of a selected clip.

It is yet another object of the present invention to provide a video digital image processing system including an interface which allows for quick modification of a selected video clip to warp an image.

It is yet another object of the present invention to provide an interface which allows the user to create his/her own library of effects which may be recalled on command to operate on a selected clip.

It is yet another object of the present invention to provide a video digital image processing system including an interface which allows the user to view abstract sample images which display the results of a particular operation.

It is yet another object of the present invention to provide a video digital image processing system which is integrated with conventional word processing programs so that scripts corresponding to existing or desired scenes in a movie can be linked with corresponding digital video image clips.

It is yet another object of the present invention to provide a digital video image processing system including a display which organizes and exhibits each video clip in a two-dimensional array, providing a Storyboard View of the clips being incorporated into a movie.

It is yet another object of the present invention to provide a digital video image processing system having an interface having a display including one or more selected clips from a plurality of clips being edited in a frame-by-frame display.

It is an object of the present invention to provide a digital video image processing system having an interface including a display which provides a view of a portion or all of the video movie being edited therein.

It should be noted that the words "desktop" or "personal" computer as used herein are intended to refer to any of the currently available general purpose single-user computers which may operate independently or network and may incorporate suitable software to perform word processing, graphics, database, and spreadsheet functions.

The words "video" or "movie" as used herein are intended to refer to any electronic display of digital data sequences as images (and, optionally, sound). As used herein, a video or movie may include one or more "clips" each of which are subsets of the movie. Each clip is itself a movie comprising a sequence of one or more frames of images (and, optionally, sound).

DISCLOSURE OF INVENTION

In carrying out the above and other objects, the digital image processing system of the present invention includes a microprocessor, random access memory, storage memory, such as magnetic disk, input means, display means, and suitable logic to provide existing digital image processing operations in a conventional graphical user interface which allows the user to implement image processing techniques without utilizing a primitive special programming language.

The image processing system of the present invention may also include suitable logic for creating data flow graphs recording the image processing operations, and associated parameters and inputs selected using the interface, thereby allowing for easy modification of a previously designed set of processing operations and reprocessing of one or more selected video movie clips through recollection, alteration, and reprocessing of the stored data flow graphs relating to the selected clips.

The video image processing system of the present invention also includes an interface capable of displaying one or more movie view windows. One movie view displays some or all of the clips of a selected movie playing in real time. Another movie view is formatted as a two-dimensional array into which some or all of the clips of a selected movie may be arranged in a Storyboard View. A third movie view is formatted as one or more horizontal strips capable of showing each frame of a selected clip in a Time line view to provide more precise display of those clips for frame-accurate editing. Another movie view is formatted as a conventional word processor file editor, and allows the user to view some or all of the clips of a movie with the associated script in text form.

These windows, known as the Player, Storyboard, Time, and Script Views respectively, together provide a complete composition and editing environment which allow the user to organize and process movie clips into a desired end product.

The Player View is in substantial part a frame-size window through which some or all of the clips of your movie can be played. A Player View window includes standard controls to start and stop your movie, control the sound volume and make selections.

The Storyboard View window provides a two-dimensional view of a selected movie including each of the clips similar to the way a spreadsheet provides a two-dimensional view of statistical data. Each cell of the Storyboard array contains a movie clip. Each row of the array represents a scene of the movie. This nonlinear organization of movie clips provides a powerful way to edit movies without resorting to the more detailed display of a frame-by-frame view.

The Time View provides a precise frame-by-frame display of one or more clips of a movie for frame-accurate editing. The Time View also contains one or more sound tracks associated with the displayed clips, for similar editing. This view also may contain a track displaying the process and inputs that created the clip. The Time View is particularly useful for specifying multiple input operations such as transition and composite when frame accurate alignment of the input movies is required. This linear view of video and audio material is also useful in making detailed editing decisions, because it displays both process information and scene information so that the user can immediately see how processing has been applied within a scene. In the preferred embodiment, the output of any image operations are automatically pasted in the Time View. In contrast, in the other movie views, the user is allowed to preview the output of the selected operation, but the output is incorporated into the movie only upon command.

The Script View window is a conventional word processor which allows the user to prepare, edit and view the script associated with the movie. The text in the Script View window may be linked or cross-referenced with associated clips so that, by clicking on a particular clip in the Player, Storyboard or Time Views, the system will search for the point in the script associated with the selected clip and enter the Script View at that point. Selected clips may be cut and pasted from the other views into the script, just as other graphic or pictorial information is inserted into word processor style sheets. When in Script View, the user may double click on any clip to play that clip.

The present invention also preferably accomplishes many of the image processing techniques on selected clips by progressively altering the frames of the designated clip on the basis of specified parameters selected only for key frames.

The present invention also provides a toolbox of digital image processing techniques including video editing, channel operations, filtering and 3-D transforms for movies which can be defined, combined, and previewed in a visual programming environment.

These and other objects, features, and advantages of the present invention are readily apparent from the following detailed description of the best mode for carrying out the invention, taken in connection with the accompanying drawings.

BEST MODE FOR CARRYING OUT THE INVENTION

Figure 1:
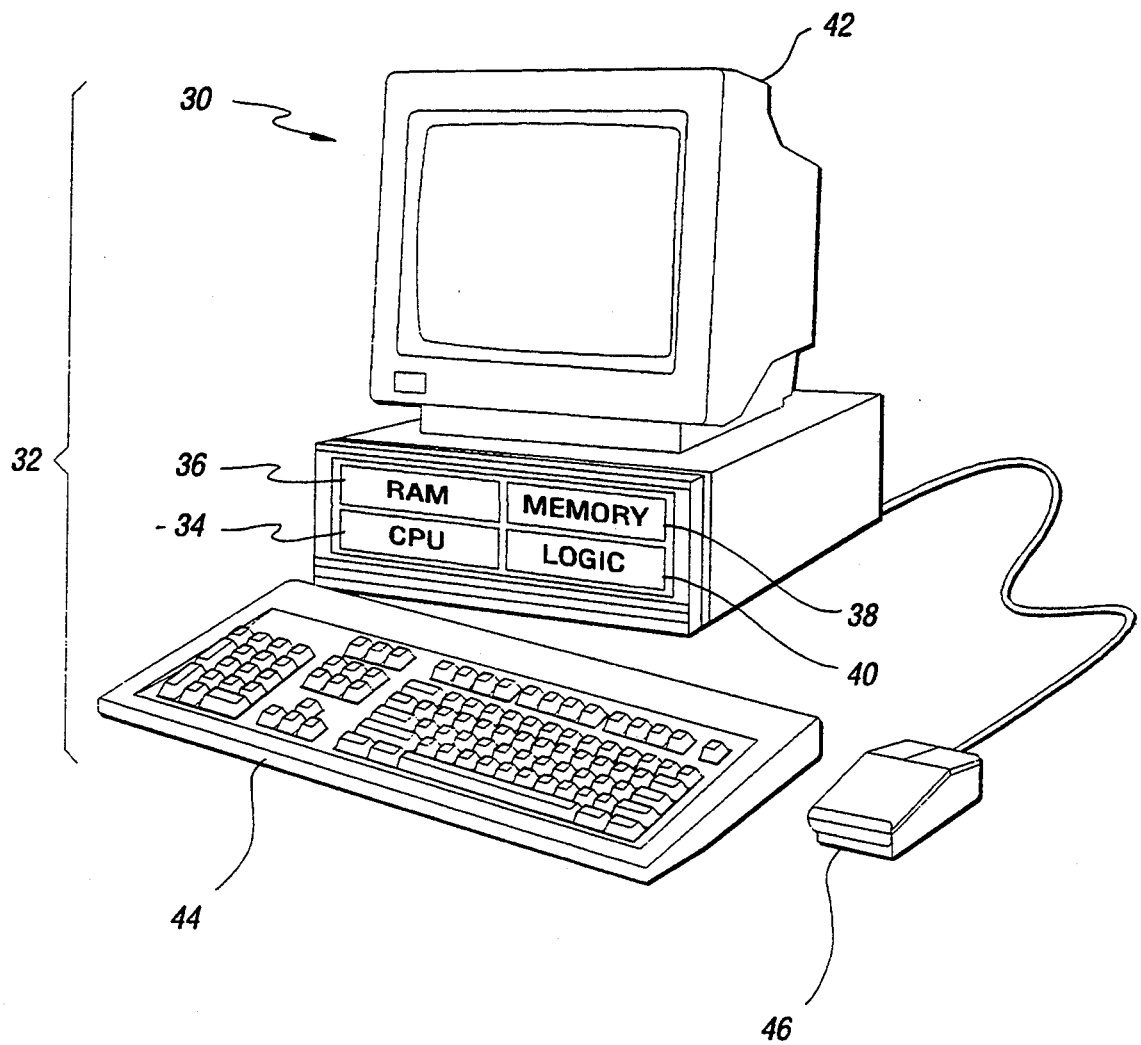
FIG. 1 is a schematic of the system of the present invention.

Referring now to FIG. 1, the video image processing system of the present invention generally indicated as 30 includes a conventional desktop computer 32 including a microprocessor 34, random access memory 36, storage memory 38, and suitable logic 40 to implement the image processing operations in the visual programming environment as hereinafter described. The system also includes a display 42, and one or more input devices such as a conventional keyboard 44 and/or mouse 46. While the image processing system of the present invention preferably utilizes an Apple Macintosh II series, having a Motorola 680X0 (68020, 68030, and 68040) series microprocessor, at least five megabytes of RAM, at least 80 megabytes of disk memory, a conventional keyboard with numeric keypad, and conventional mouse or roller ball, other commercially available general purpose desktop computer hardware with similar color graphics capabilities may also be utilized for this purpose.

Logic suitable for providing the image operations, file utilities, and the visual programming interface hereinafter described are preferably programmed in a Unix language such as "C". Again, however, other similar general purpose programming languages may be utilized to implement the logic and interface described herein.

Figure 2:
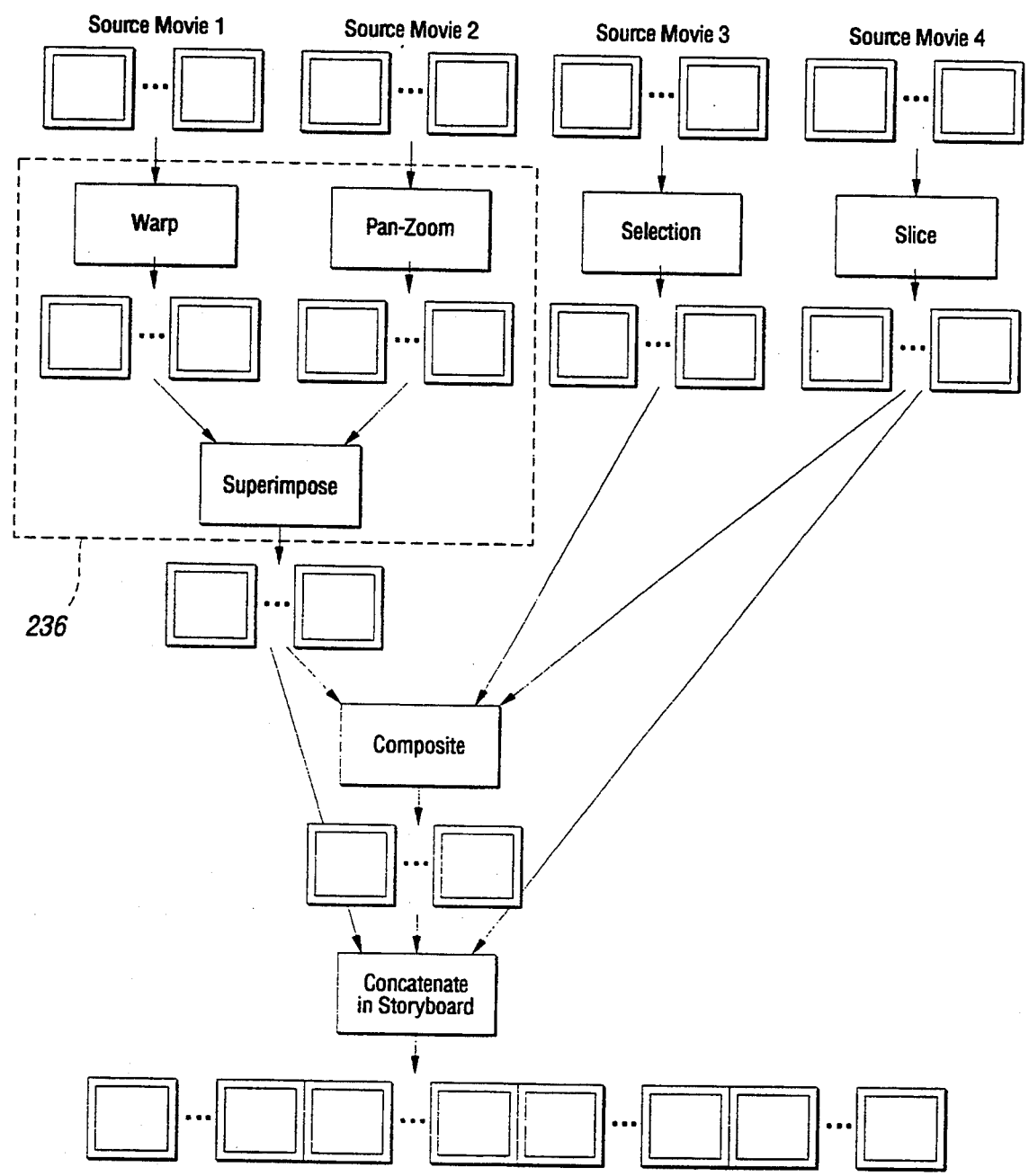
FIG. 2 is a dataflow diagram for a representative movie processed using the present invention.

Referring to FIG. 2, the system of the present invention preferably employs a dataflow architecture which enables the system to capture and reproduce all the operations (or steps) in the creation of a movie. At each step, the system must interact with the user via the interface described hereinafter to identify the one or more input movies, the key frame (preferably the first frame and last frame of a clip), control parameters required for implementation of a selected operation. The system then implements the selected operation, generates an output movie, and, if desired, saves that output movie as a new clip. As a result of the multiple input nature of each process the dataflow is capturing more than just a "list" of operations that is to be performed on a clip. Rather, it is capturing all of the movie edits and all of the combinations of clips. The interrelationship between the steps in the process is defined by the relationship of the inputs and outputs of each of the steps. Thus, all aspects of movie making are captured in a dataflow structure which defines the inputs, parameters and output(s) for each step. Since each input (clip) is a movie and each output is a movie, each step in the process is unrelated in time to the other steps except as the output movies from any one particular step are required as input movies to any other particular step.

It will be appreciated that a set of operations and inputs could be defined and appear in the dataflow graph shown in FIG. 2 as a single operation. For example, if the Warp, Pan-Zoom, and Superimpose operations shown at 236 were to be used with inputs other than Source Movie 1 and Source Movie 2, that combination of operations might be grouped as a single operation having two inputs (in place of Source Movie 1 and Source Movie 2) and one output.

It will also be appreciated by those skilled in the art that the dataflow processing implemented by the system of the present invention is not limited simply to the video portion of a movie. There is no inherent data type limitation in the dataflow structure of the system of the present invention. As used herein, a movie may represent any sequence of dynamic media including video data, audio data, control data (e.g. key frame parameters as a function of Time), MIDI music data or SMPTE time code information. All of these different media are time dependent, are part of the movie, and may be used as input in the dataflow process in the manner described herein. For example, control information may be used as input to a process to change the audio portion of a clip over Time.

It should be noted that, from the movie dataflow diagram, individual diagrams for each media type may be derived directly if so desired. Thus, it is possible to generate the dataflow graph of all parts that operated in some way on the video portion of a movie, or the audio portion of a movie, or the MIDI portion.

Use of the dataflow architecture for the system of the present invention also provides for easy processing of a movie. After a movie (comprising one or more smaller individual movies or clips) has been completed using the interactive graphical user interface of the present invention, the dataflow graph corresponding to that interactive session of the type shown in FIG. 2 may be automatically created by the system and can be saved by the system and/or displayed to the user. If a change is desired, the user may identify the particular operation, revise the parameters, or one or more of the clip inputs, for that operation, and re-execute that operation. Once the operation generates a revised output, this output can be automatically supplied wherever required as a new input and those operations utilizing the new input can be similarly reprocessed. This "trickle down" process continues until all operations whose input has changed have been reprocessed.

It will be appreciated by those skilled in the art that, for any particular edit, only those operations whose input has changed must be re-executed to generate the new, final movie. By generating only the media that was affected by the particular editing change, the system is, therefore, very efficient in its use of computing resources.

It will also be appreciated by those skilled in the art that a movie can be edited using compressed image data which may also be at a lower frame rate and, once completed, the dataflow graph defining the process can be used to reprocess the entire movie using higher resolution images as input. This reprocessing could occur using high resolution digital image data as input for the required clips. Alternatively, the assembly and edit process can be implemented utilizing the dataflow graph for a movie on a different, remote system using the original media as the input.

The system of the present invention preferably utilizes the digital image formatting compression functions of QuickTime TM, a software package available from Apple Computer, Inc. MacStile TM, a software package available from Software Originals, Inc. is also preferably utilized to create the dataflow graphs utilized by the system.

Figure 3:
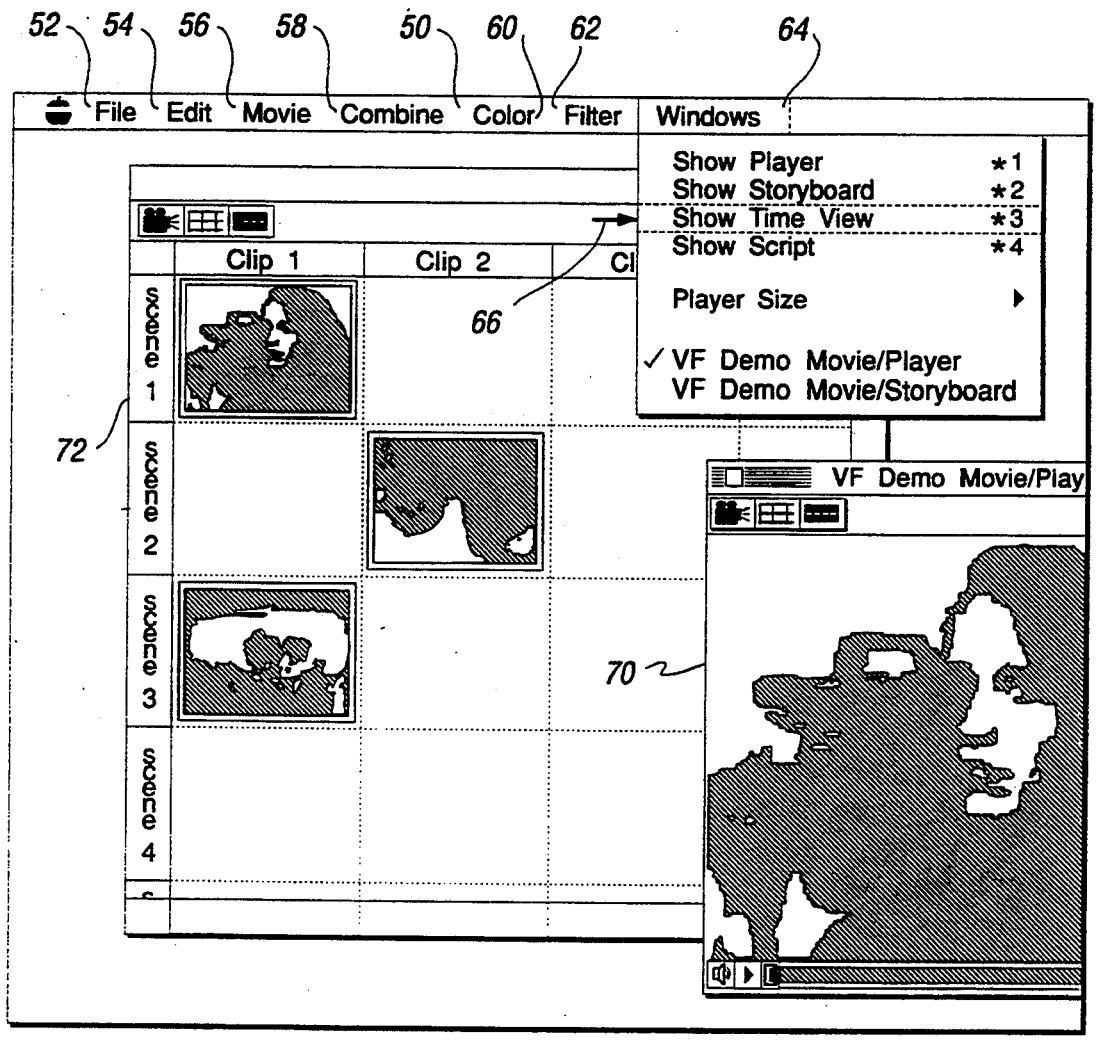
FIG. 3 shows a typical multiple window display of the present invention in which the "Windows" menu is pulled down.

Referring now to FIG. 3, the display 42 provides a graphical user interface including a menu bar 50 containing the names of each of the program menus 52-64. As with conventional graphical user interfaces (GUI's), the commands available under each of the menus 52-64 may be displayed by keystroke command, or by positioning the arrow 66 over the desired menu name and clicking to "pull down" the available commands. For example, by clicking on the Windows Menu 64, the various commands may be pulled down and invoked. Again, as with conventional pull down menu interfaces, the commands are invoked by holding the mouse button down and positioning the arrow 66 down the menu until the desired command is highlighted, then releasing the mouse button. A desired command may also be invoked by striking the key combinations listed in the pull-down menu opposite the command. Consistent with conventional GUI's, the user may move from an active window to another window by positioning the cursor to the other window and "clicking" on it. Alternatively, the user may position the cursor on an icon associated with the desired window or action and "click" on the icon. Again, as with conventional GUI's, the user may double click on a file to load the data in the file or, if the file is a program, run the program. For example, the user may position the cursor over the clip displayed in any of the view windows and double click to play that clip.

The display 42 may also include one or more of the movie views 70-76, from which the user can view and edit selected clips of a movie. It will be appreciated by those skilled in the art that each of the movie views 70-76 provides a different perspective from which clips can be viewed, analyzed and modified. For example, the Player View 70 offers a viewing screen for playing or stopping an entire movie or selected clip therefrom.

Figure 4:
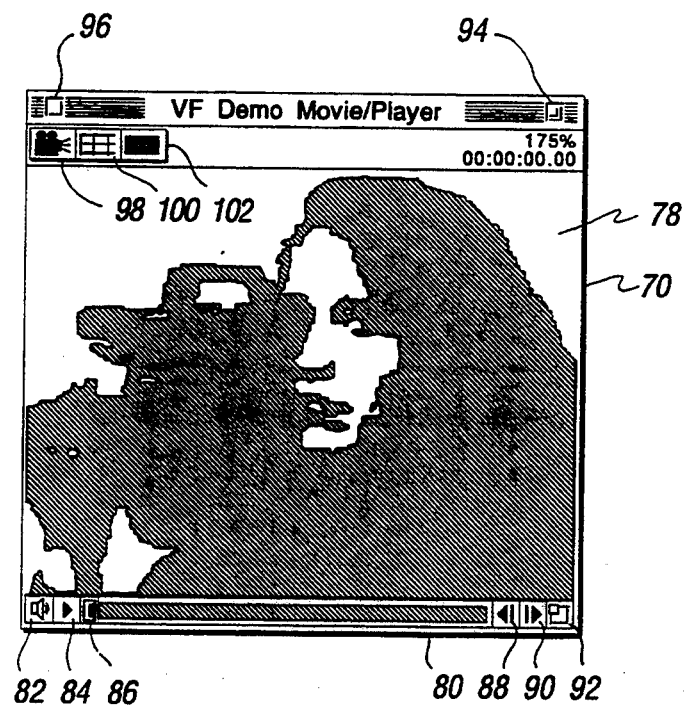
FIG. 4 illustrates the Player View window.

Referring to FIG. 4, the Player View 70 includes a movie controller 80 which provides quick access to the controls for the viewing screen 78. By clicking on the sound button 82, the volume of the sound can be adjusted. By clicking on the play button 84, the movie can be started and stopped. By clicking on the slider 86, the user can move to any frame in the movie or clip being displayed in the viewing screen 78. The play reverse 88 and play forward 90 buttons can be activated to play the clip in the reverse or forward direction respectively for so long as the mouse button is held down. As with conventional GUI's, the sizing button 92 can be activated to resize the Player View 70. Similarly, the Player View 70 can be quickly toggled between a selected small and large size by clicking on the square 94 in the upper right corner of the window, and the window can be closed by clicking on the quit button 96 in the upper left corner of the window.

The Player View 70 also preferably includes a series of icons 98–102, each representing a movie view. For example, clicking on the Storyboard View icon 100 will open the Storyboard View window 72.

The Player View 70 may also include other information such as the filename of the current movie, the screen size, and the location of the current frame displays.

Figure 5:
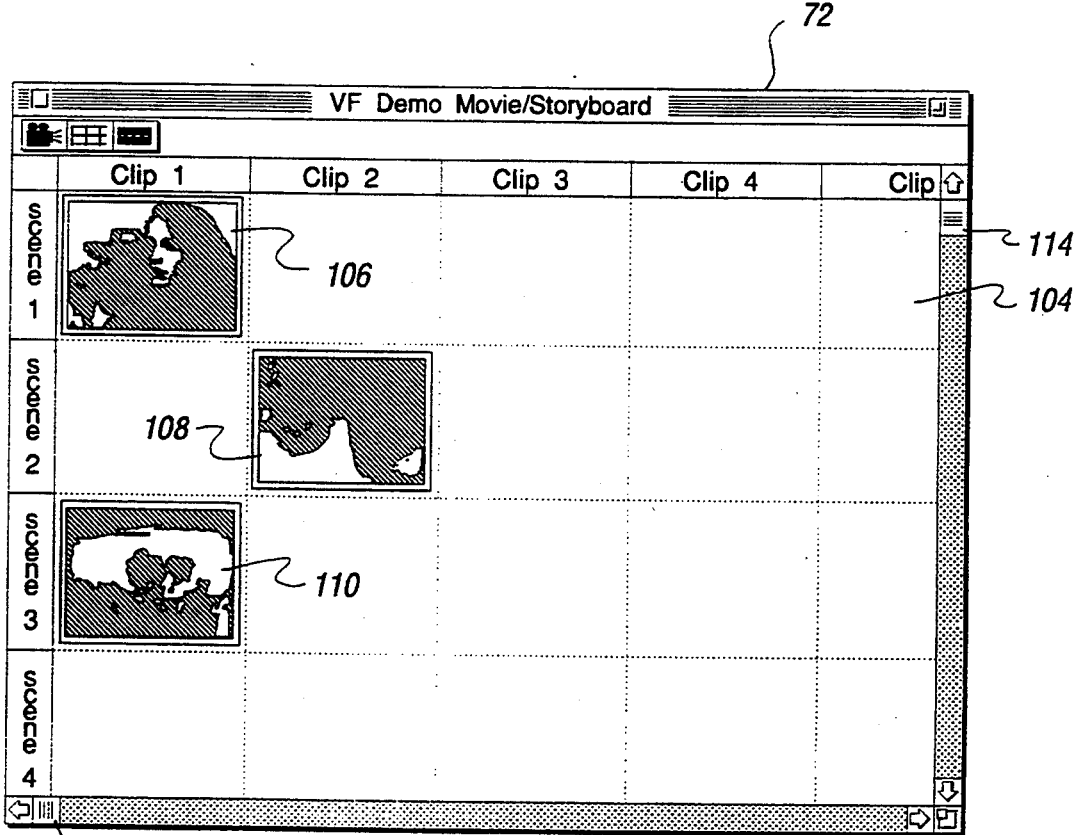
FIG. 5 illustrates the Storyboard View window.

Referring now to FIG. 5, the Storyboard View 72 includes a two dimensional Storyboard array 104 which provides a grid upon which the clips 106–110 of a movie are arranged. In the preferred embodiment, up to five rows, labelled Scenes, and six columns, labelled Clips, may be displayed on a full-sized conventional screen. In addition, a conventional horizontal slider 112 and vertical slider 114 may be positioned to scroll and pan over the entire fifty scene x fifty clip grid. Each of the clips may be moved, viewed, and edited in the Storyboard View by selecting a clip (clip 110 is selected in FIG. 4, as denoted by the double-dark border) and implementing any of the system commands, as further described below. It will be appreciated by those skilled in the art that the Storyboard View 72 provides a clip-by-clip perspective that allows for easy rearrangement and processing of clips in a movie. The Storyboard View also makes efficient use of available screen space when working with a large number of clips.

Storyboard View 72 is particularly useful when performing operations that require multiple clip input, such as the Arithmetic, Transition, Mix, Composite, and Merge commands found in the Combine Menu (described hereinafter). As will be appreciated by those skilled in the art, in the case of multiple clip inputs, the Storyboard is acting as a video switcher, allowing the user to direct any particular set of clips to one of the multiple input operations. The power of this Storyboard architecture allows the user to first operate on clips with filters and segmentation tools, such as Slice (described hereinafter), then easily use the output of those operations as input to combining operations, such as composite, with no need to explicitly save intermediate result clips beyond simply dragging those clips to a Storyboard.

When the movie in a Storyboard View is played, it will be played in scene order then clip order. Thus, referring again to FIG. 5, clip 106 will be played first, then clip 108, then clip 110.

Figure 16:
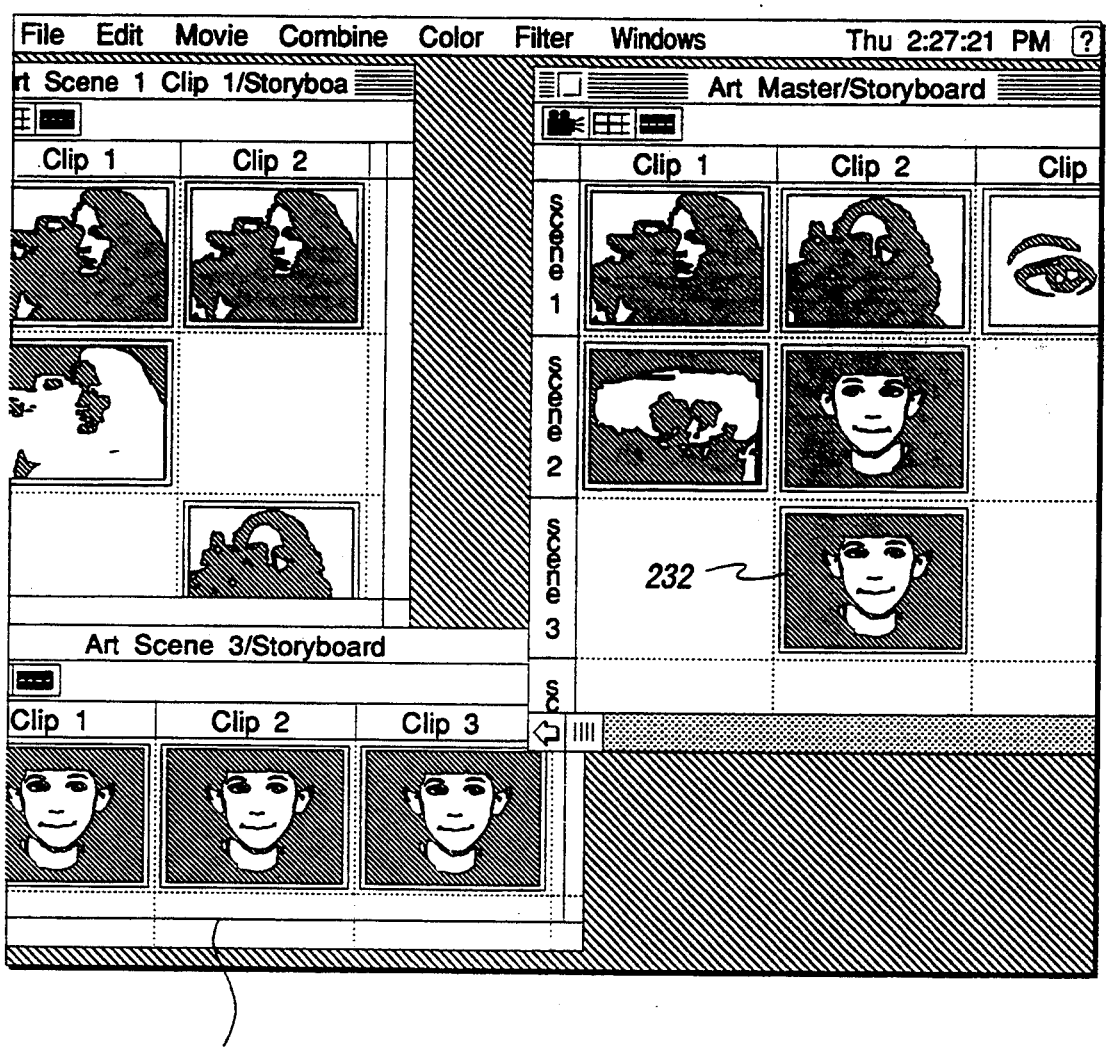
FIG. 16 is a screen illustrating an implementation of a three dimensional Storyboard.

FIG. 16 illustrates an alternative, three dimensional Storyboard View which may be implemented in the system of the present invention. The Storyboard for a particular movie, such as "Art Master" may be opened in the manner described above. A clip 232 could then also be selected as described above. In this alternative embodiment, a predefined command could then be activated which would open yet another Storyboard View 234 including each of the clips of another movie, which other movie corresponds to clip 232 in the "Art Master" Storyboard.

As will be appreciated by those skilled in the art, the alternative three dimensional Storyboard illustrated in FIG. 16 accommodates an n-deep hierarchy which links a particular clip from one Storyboard (for example, clip 232) to another Storyboard View (234) including each of the clips comprising clip 232. By clicking on one of the clips in Storyboard View 234, the user could activate yet another Storyboard which similarly includes all of the clips which form the movie corresponding to the selected clip in Storyboard View 234. This hierarchical structure could be augmented by providing a command which provides the dataflow graph identifying the inputs and the operation required to create any selected clip. In this manner, the user can access the input data and specific parameters and operations at any level in the hierarchy of the evolution of any selected clip or movie.

Figure 6:
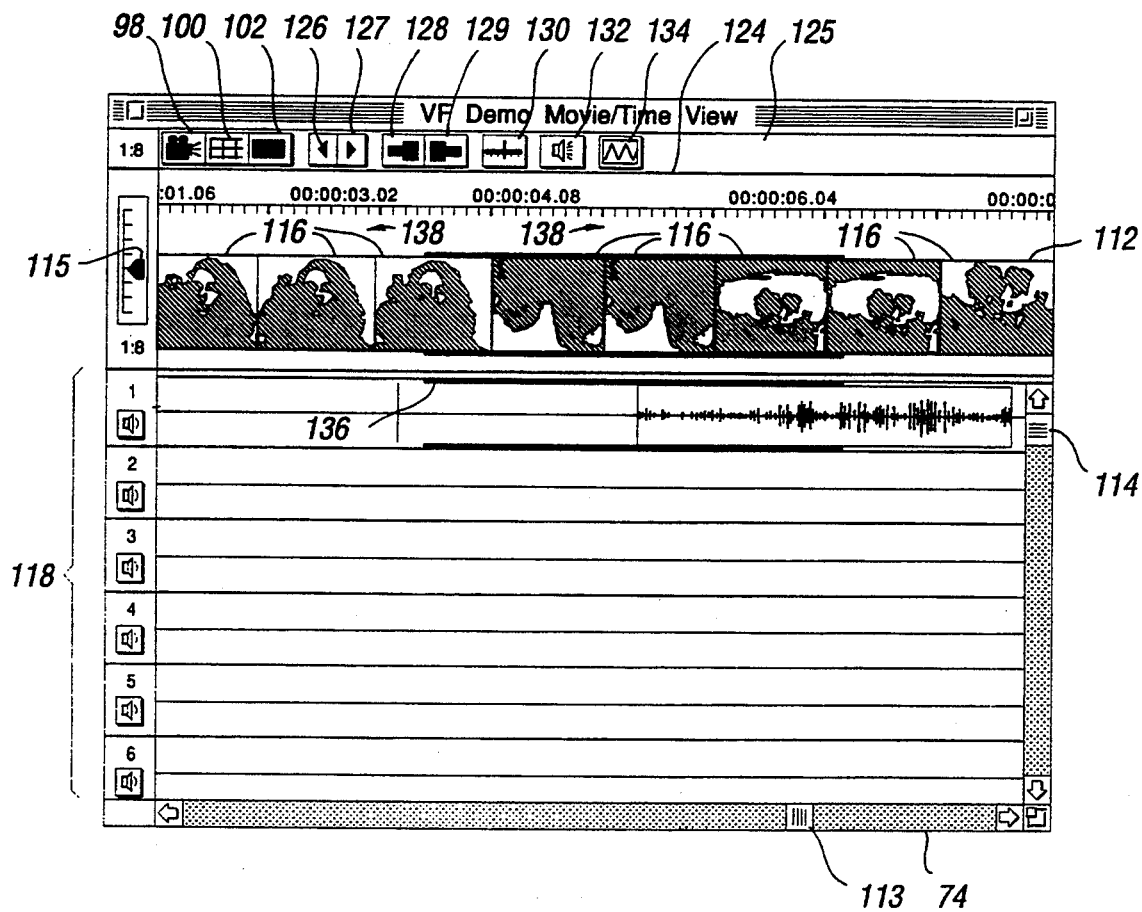
FIG. 6 illustrates the Time View window.

FIG. 6 illustrates another movie view, the Time View window 74. The Time View 74 includes a horizontal strip 112 displaying the clip or clips of the movie along with up to eight additional horizontal sound bands displaying the audio data associated with the clips shown in the framestrip 112. At full screen size, the Time View window 74 displays eight frame displays 116, each corresponding to one or more frames in the selected clips. By clicking on the time scale indicator 115, the ratio of the number of frames per frame display 116 can be adjusted from 1:1 to 1:128. Thus, the Time View for a particularly long movie can be "condensed" so that each frame display 116 shows a representative one of a multiple number of frames in a sequence. Alternatively, the frame display ratio can be set to one to one so that every frame in the movie may be viewed and edited.

As with the Storyboard View 72, conventional horizontal and vertical sliders 113 and 114 are provided to allow display of each of the horizontal frame displays 120 and horizontal sound bands 118 regardless of the selected Window size.

As with the Storyboard View 72, once the Time View 74 is activated, a frame or group of frames may be selected for processing using the system commands described below. It should be noted that by clicking on the frame ruler 124 the frame display 116 can be quickly toggled between its current ratio setting (shown in FIG. 6 as 1:8) and 1:1. Thus, the single frame display can be quickly and easily accessed for frame accurate selections.

It should be noted that, in addition to the Player Storyboard, and Time View icons 98–102, a number of other icon buttons 126–134 are provided in the ribbon controller 74 for quick positioning and easy control of the marked media. The clip-to-clip buttons 126, 127 allow the user to position to the previous and next clip boundary (indicated by the clip markers 138) respectively.

One or more frames can be selected, as indicated by the selection bar 136 by clicking and dragging along the horizontal frame display strip 116. Portions of the horizontal frame display strip 116 may also be selected by using standard Macintosh ™ selection methods. A group of frames can be selected and played, in the Player View 70, by activating the Play in Selection command under the movie menu, as hereinafter further described. Clip markers 138 identify the beginning and end points of each of the clips in the movie. Markers 138 may be added or removed by clicking on a frame and executing the insert or remove clip marker command under the edit menu.

Thus, it will be appreciated by those skilled in the art that the Time View window 74 provides for precise frame-by-frame and clip-by-clip identification and editing of a movie, with immediate access to the alternate perspectives of the Player View 70, Storyboard View 72 or Script View 76 by activating the appropriate icon or menu command.

It should be noted that, though each of FIGS. 3–18 illustrate individual windows, these windows would appear on a display along with the menu bar 50 as shown in FIG. 2, so that all of the available commands are available through a series of clicks of the mouse 46. It should also be noted that standard Macintosh TM selection and basic editing methods (such as Cut-/Copy/Paste) are utilized by the system of the present invention. Thus, movies may be freely moved between or within the Player, Storyboard and Time Views. Drag and Drop is supported for Preview windows, and within the Storyboard View to move movies easily while processing.

Figure 17:
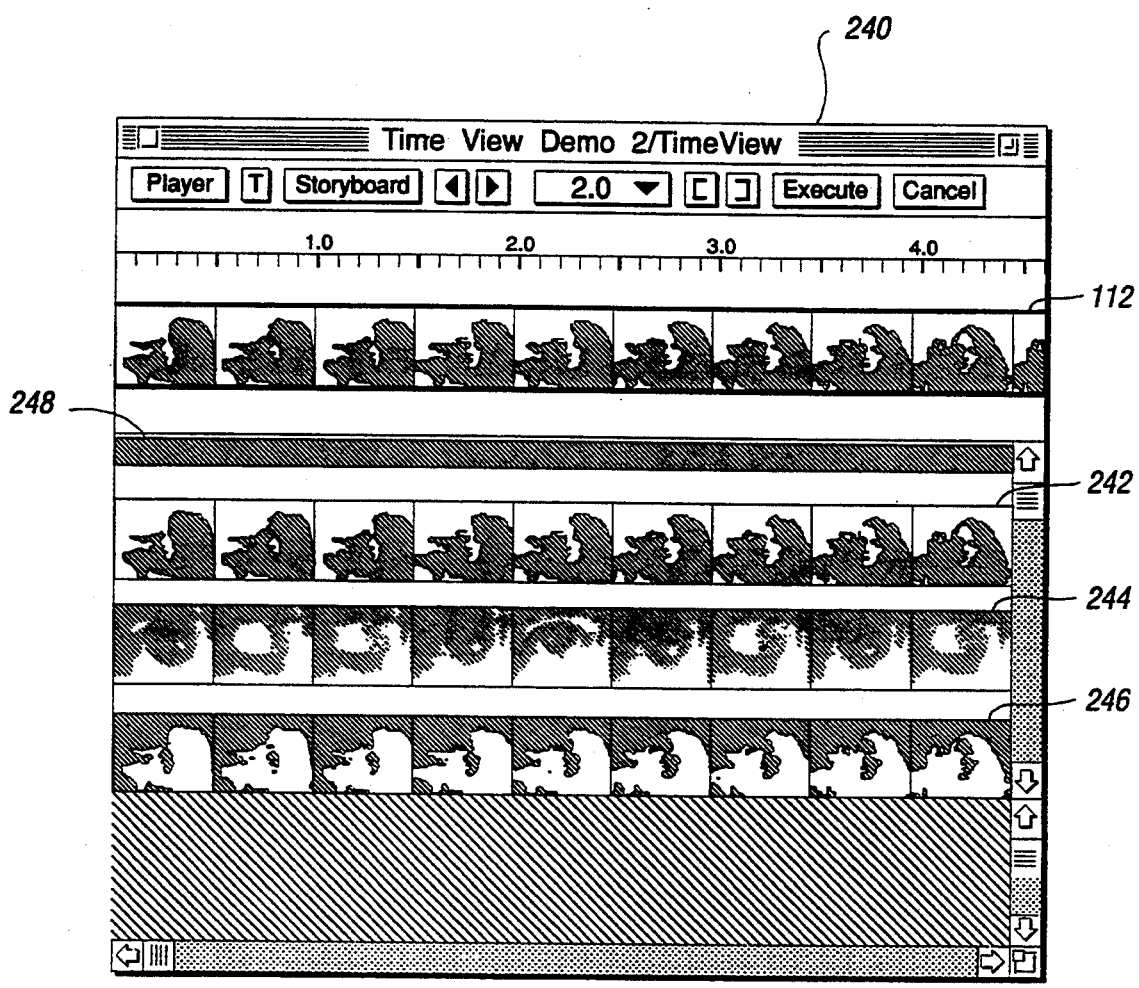
FIG. 17 is a screen illustrating an implementation of an alternative embodiment of the Time View window.

FIG. 17 illustrates an alternative Time View Window 240 which may be implemented in the system of the present invention. In this alternative Time View, the horizontal strip 112 displays a selected clip or clips of a movie in the same manner as described above in connection with FIG. 6. In addition, one or more clips 242–246 corresponding to the input to the operation that produced the selected clip at 112 may also be displayed, along with an identification of the operation, at 248. In this manner, the user may view the preceding operation that resulted in the creation of the selected clip on a frame-by-frame basis to determine whether, for example, alteration of the input and/or parameters for that operation, and reprocessing, is desirable. It should be noted that, as with the hierarchical structure of the three dimensional Storyboard illustrated in FIG. 16, the system of the present invention could be implemented to allow the user to click on one of the input clips 242–246 to obtain yet another Time View Window showing that input clip as the selected clip at 112, and further showing the input clip or clips and associated operation which yielded the selected clip.

Figure 7:
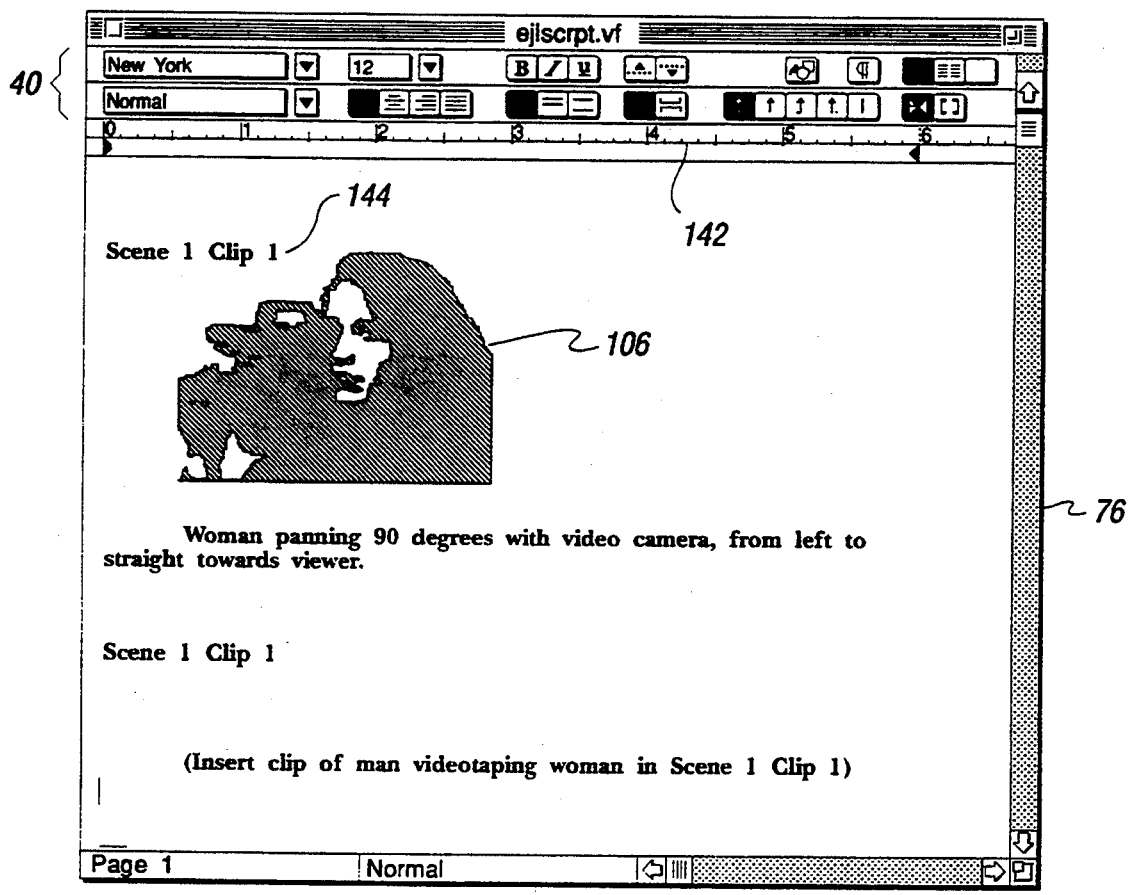
FIG. 7 illustrates the Script View window.

Referring to FIG. 7, the Script View 76 links selected frames or clips from the movie with a script by activating a commercially available word processing program, such as WordPerfect TM or Microsoft Word TM for the Macintosh TM. The text of the script can be input or edited just as any document might be prepared in using the word processing program. Thus, the top portion of the Script View 76 includes the menu bar 140 and associated programming guides such as the rule 142 from the word processing program. For those programs which allow importation of graphics into documents, a clip 106 can be imported into the document. For those word processing programs that are Apple ® Quicktime ® aware, a clip can be played directly from the Script View by double clicking the mouse 46 on the image.

The system 30 also cross-references those portions of the script which are marked (for example, Scene 1, Clip 1 at 144 with the corresponding clip), so that if, for example, the user was working in the Storyboard View window 72 and activated the clip at Scene 1, Clip 1 and then activated the Script View window 76, the window would open with the script positioned in the window at Scene 1, Clip 1. Conversely, if the Script View is active at, for example, Scene 1, Clip 2 and the Player View 70 is activated, the viewing screen 78 would display Scene 1, Clip 2. It will be appreciated by those skilled in the art that this integration of the scripting of the movie with the video and audio portions, greatly aids in the efficient organization and assembly of the movie.

The program menus and their associated commands are summarized below:

File—All system documents are managed through the File Menu. These documents may include digital image files, audio files, or text (script) files. The digital image files may be compressed, and are formatted in conventional QuickTime TM, PICT or PICS formats. Sound files are kept in AIFF format.

The File Menu may include conventional file management commands such as "New" for opening a new movie file, "Open" and "Open As" for opening existing files, "Close" for closing the currently active window, "Save" and "Save As" for saving the current version of a movie. The File Menu also preferably includes a "Print To Video" command which clears the computer display to provide a menu and icon-free environment (for example, a solid blue background) over which a selected clip or movie is displayed so that the user can output the information displayed on the screen directly to tape. The File Menu also includes a "Preferences" command which allows the user to set certain program defaults, and a "Quit" command which allows the user to exit the system.

Edit—The Edit Menu preferably includes commands which are used to move selected portions of media between movies. Both sound and video media may be moved with these operations. Edit commands include "Undo" which cancels the effects of the last command selected, "Cut" which removes the media (sound, video or both) of the current selection from the current movie and places it in the clipboard, "Copy" which places a duplicate of the selected media into the clipboard, "Paste" which places media from the clipboard into a movie at the current location of the cursor, "Paste Replace" which performs the same operation as "Paste", except that the media is pasted over, and replaces, the clip located at the current location, and "Clear" which removes media from a movie without saving it to the clipboard. It should be noted that, as used herein, the clipboard is a conventional editing clipboard provided by the Apple Macintosh System, or an analogous work area which temporarily holds data that is being cut, copied, or pasted during editing operations.

The Edit Menu also preferably includes "Select All" which selects all of the media in the current movie from the first to the last frame, "Select None" which turns off any existing selection, "Set Track Volume" which allows for the volume of the track to be set whenever an insertion point is set in one of the soundtracks in the Time View, and "Insert/Remove Clip Marker" which inserts or deletes a marker at the selected position of a clip in the Time View.

Movie—The Movie Menu contains commands which define a movie, control the playback of the movie, and provide other detailed information about the current movie. Particular commands that may be implemented in the Movie Menu include "Crop" which creates a new movie from a selected portion of the input movie, "Resize" which makes a new movie of a specified new size from a selected portion of the current movie, and "Recompress" which compresses the selected media according to one or more conventional compression schemes.

The Movie Menus also contains "Set Duration" which changes the overall length of the selection in the current movie, "Vary Speed" which changes the duration of each frame in the current selection according to a selected speed factor, thereby producing a new movie that runs either faster or slower than the original, and "Play In Selection" which determines whether a selected portion or all of the current movie plays whenever the play button in the movie controller is clicked.

The Movie Menu also includes "Loop" which, if set, plays the movie repeatedly from beginning to end when the play button is clicked, "Loop Back And Forth" which, when activated, plays the current movie forward from the current frame to the end of the movie, then in reverse to the beginning of the movie and repeats the loop continuously whenever the play button is clicked, and "Get Info" which provides detailed information about the current movie.

Combine—The Combine Menu includes commands which combine or overlay selected portions of a movie in various ways. These commands may include "Transition" which performs a selected one of various conventional selected transitions between two identified adjacent clips, "Blend" which mixes selected portions of two clips together, "Chroma Key" which allows the user to select a color band in a clip (within a specified tolerance), which selected color band will be rendered transparent and through which a background clip will be seen. Combine also includes "Composite" which overlays (on a pixel-by-pixel basis) a foreground clip on a background clip using a third clip (called an "alpha channel mask" or "matte") to provide the information about how the first and second clips should be mixed, and "Mix" which performs algebraic additions of two selected inputs.

The Combine Menu also includes the "Arithmetic" command which performs standard addition, subtraction and multiplication operations between two selected clips. These operations are performed on a frame-by-frame basis and on a pixel-by-pixel basis within each frame pair.

The Combine Menu also includes the "Logical" command which combines movies using the logical "and", "or" and "exclusive or" ("XOr"). This command is particularly useful for creating alpha channel masks from multiple black and white channel input movies. It can also be used on color movies for color modification and unusual image composites.

The Combine Menu also includes a "Merge" command which combines three channels into a single color movie. The three channels may represent either the RGB model or the HSV model.

The Combine Menu also includes the "Replace" command which allows for selective replacement of any one channel in a color movie.

Color—The Color Menu provides commands which operate independently on each of the color channels for each frame of the selected clip. Two color models are supported, the RGB model, containing Red, Green and Blue channels used by the Apple Macintosh ® operating system and the HSV model containing Hue, Saturation and Value (or intensity) channels often used by artists.

The Color Menu includes the "Extract Channel" command, which removes a specified channel from a color clip and stores it as an 8-bit movie, which may then be displayed and used as a black and white clip.

The Color Menu also includes the "Balance" command, which provides time varying control over the color balance of a selected clip.

The Color Menu also preferably includes the "Cycle" command which adds a constant to each pixel value in a selected channel of the input movie.

The Color Menu also preferably includes the "Edges" command which finds edges in a movie by locating changes in adjacent pixel values. These edges are assigned the color defined by the edge color buttons in the dialogue and are multiplied by the slider setting to control brightness.

The Color Menu also preferably includes the "Negative" command, which extracts one or more selected channels from each frame of the clip.

Two other commands which are preferably included on the Color Menu are "Pallet" and "Custom Pallet". Pallet colorizes a black and white channel or remaps the colors in a color movie using a 256-color pallet. Because there are 256 allowable pixel values in a channel, ranging from 0 (black) to 255 (white), each can be assigned a specific color using a pallet. A variety of pallets are provided from which a beginning and end pallet may be selected.

This process creates a color movie from a single channel. If you specify different pallets for begin and End Times, the system creates a new color pallet for each frame of the clip. These pallets will very smoothly from the beginning of the clip to the end, exhibiting a slow color transition when the clip is played.

The Custom Pallet command remaps the colors in a clip using a 256-color pallet in the same manner as the pallet command. However, Custom Pallet allows you to create the pallet interactively by specifying a single color for each end of the pallet. The remainder of the pallet is created for you by interpolation. Custom Pallet allows for two different custom pallets, for the beginning and the end of the clip respectively. Pallets are then created for the intervening frames by interpolation so that the colors in the final clip change slowly from the begin pallet to the end pallet.

Filter—The Filter Menu provides access to a variety of commands which change the appearance of a movie, taking a single clip as input, operating on its video portion, and outputting a new, modified clip.

Commands accessed via the Filter Menu include "Pan Zoom" which changes the position of the video plane in two dimensions and to zoom up or away from a movie.

The Filter Menu also includes the "PZR" or "Pan-Zoom-Rotate" command which may be used to change the position of the video plane in three dimensions. In addition to the pan and zoom capabilities, PZR also rotates the plane of the image above any of the X, Y or Z axes. The PZR command will be discussed hereinafter in further detail.

The Filter Menu also includes the "Warp" command which stretches the image in a selected clip as if they were on a flat rubber sheet. This command is also described hereinafter in further detail.

The Filter Menu also preferably includes "Slice" which replaces a range of values in a channel with a specified constant. This command allows you to segment objects from an input movie by specifying the range of values they contain. As will be appreciated by those skilled in the art, the default values of zero outside range and two hundred fifty-five inside range of the slice values will create a binary mask of the selected range which may then be used as an alpha channel mask an other combine operations. This command is also useful for modifying the color information in a clip.

Another command which is preferably included in the Filter Menu is "Threshold". Threshold clips a channel at a specified value. All pixels below that value are set to zero (black) while all pixels above it are set to 255 (white). In the case of a color clip, each of the RGB color channels are operated on independently. The Threshold command is used to select objects of interest which are the brightest objects in a channel. This command is a simpler version of the slice command. It can also be used for modification of the color space in color movies, providing an effect similar to a two-level "posterize". The "Window" command is also preferably included in the Filter Menu. The Window command displays only a selected portion of the values in a channel, thereby highlighting some features and hiding others. The range of selected values are reassigned to fill the entire range of 0–255. Thus, any value above the upper setting in the range is set to 255, and any value below the lower setting is set to zero. As a result, the selected range of values becomes the only visible portion of the movie. This command is useful for adjusting the visual appearance of a movie that may have been recorded too light or too dark.

Another command that is preferably included in the Filter Menu is "Scale". Scale changes the brightness and contrast of a clip by changing the values of the pixels directly. Each pixel in the clip is multiplied by the scale factor. Thus, scale factors less than one dim the movie while those greater than one brighten it. Offset values may also be selected to similarly change the contrast of a clip. Offset values greater than zero (1 to 255) reduce the contrast of a movie while those less than zero (−1 to −255) increase the contrast. The combination of the scale and contrast controls provides a general mechanism for adjusting the display characteristic of a clip. The Scale command is also useful for modifying the values in a movie prior to using it in the Arithmetic command with another movie. This feature allows you to control which movie will dominate when the arithmetic operation is performed. Scale is also useful when operating on a grey scale channels for creating alpha channel masks. Controlling the brightness of the grey scale channel controls the dominance of the foreground movie when compositing.

The Filter Menu also preferably includes "Convolve" which provides a Time varying filter for selected clip. One of a variety of known filters, such as Sharpen, Smooth, Smooth More, Edge All, Edge Horizontal, Edge Vertical, Edge Diagonal/, Edge Diagonal\, Emboss, or Shadow, may be selected for application on a frame-by-frame basis to a selected clip. In addition, different beginning and ending blends of the filtered and unfiltered image may be selected. The filtering on intervening frames of the clip will be performed by creating the unique filter for each frame of the clip based upon the beginning and end filter blends specified.

"Custom" is also preferably included in the Filter Menu. Custom provides for a custom three-by-three convolution kernel in addition to the above specified convolved kernels which filter a selected clip on a frame-by-frame basis. As with Convolve, a beginning and end blend of the filtered image with the original image can be specified. If the beginning and end blends are different, filtering on each of the intervening frames will be performed by creating a unique filter for each frame based upon the beginning and end filters. In addition, Convolve allows for specification of a scale (brightness) and offset (contrast) factors for each of the beginning and end points. Again, when these parameters are different for the begin and end frames, they are varied for each of the intervening frames.

Another command preferably located on the Filter Menu is "Shape". Shape performs mathematical morphology (such as erosion or dilation, or conventional combinations of these operations) on a selected clip using a preselected structuring element.

The Filter Menu also preferably includes "Posterize" which controls the number of discrete levels in a channel. For a 24-bit color movie, there are 256 levels in each channel (0–255). For a 16-bit movie, there are typically 32 levels in each channel. Posterize reduces the number of discrete levels to between 1 and 16, creating a paint-by-number or poster effect as the number of colors or levels are reduced.

Another command preferably found on the Filter Menu is "Mosaic" which controls the apparent pixel size of each of the pixels in a clip. By specifying the horizontal and vertical size of the pixels in any one frame of the movie, a lower resolution version of the input movie can be created. The larger pixels in the output movie are formed by averaging the color values of all the pixels in the input movie that fall within the defined dimensions of the new pixel. As with other commands, different beginning and ending pixel sizes can be specified, and the system will operate independently on each frame of the clip to produce a smoothly varying pixel size for the clip.

The "Plug Ins" command in also preferably included on the Filter Menu. Plug Ins provides a directory into which any conventional, commercially available image filtering operation, such as the Aldus Gallery of Effects ™ and other Adobe Photoshop ™ compatible effects may be inserted. The system may perform a filtering operation on each frame of the selected clip using any one of the effects selected from this user created library.

The Filter Menu also preferably includes the "Motion Filter" and "Motion Shape" commands. Motion Filter and Motion Shape are temporal convolution and mathematical morphology operations respectively which use information from both the preceding and succeeding frames when processing a frame by utilizing a selected three dimensional structuring element, corresponding to single dimension structuring elements for each of Time periods n−1, n, and n+1.

Window—Referring again to FIG. 2, the Window Menu provides commands which allow the user to open any of the four movie windows. The "Show Player" command opens a window which displays the Player View.

The "Show Story Board" command opens a window which displays the story board view.

The "Show Time View" command opens a window which displays the Time View.

The "Show Script" command opens a window which shows the Script View.

The Window Menu also preferably includes a "Player Size" which provides for double size, normal size, half size, and quarter size default window sizes for the Player View window.

The Window Menu also displays a list of the current opened movie windows, indicating which of those windows is active.

FIGS. 8–14, along with the following description set forth in detail the operation and interface for the Pan-Zoom-Rotate command.

Figure 8:
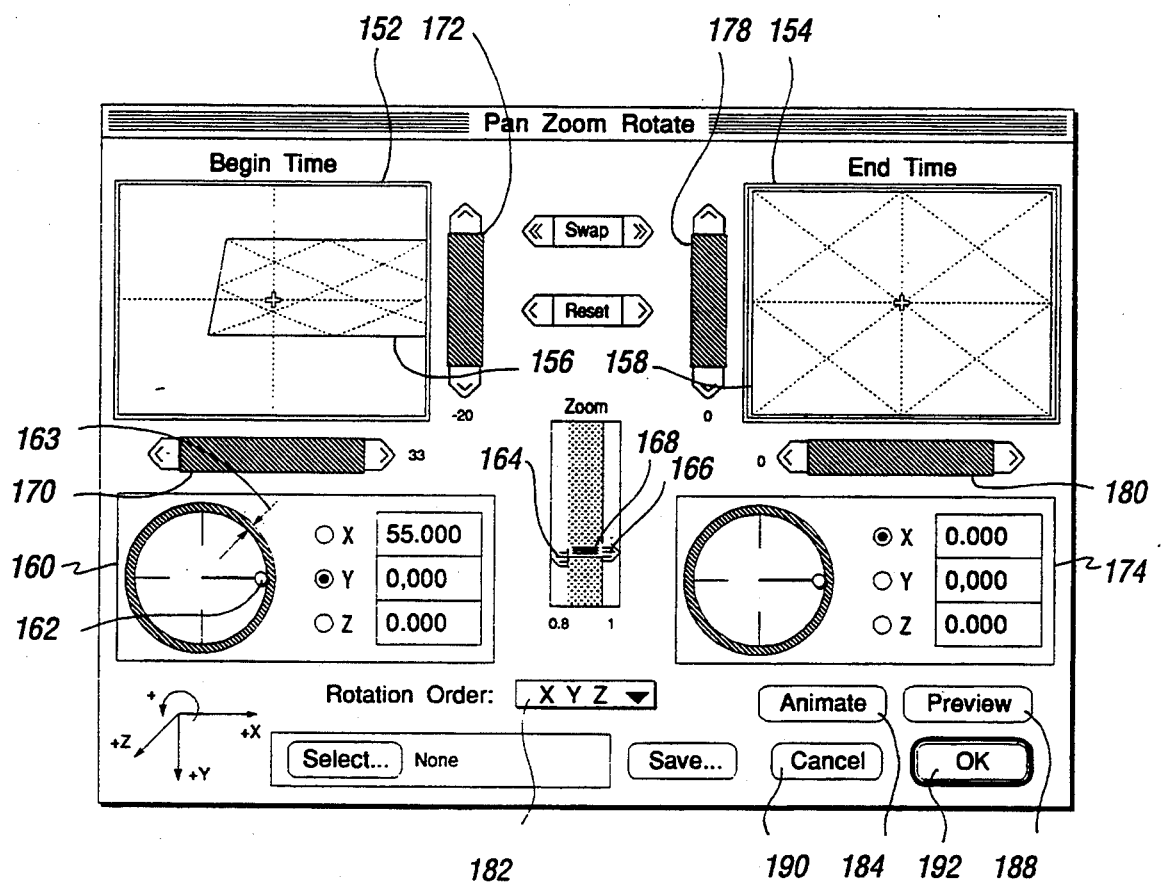
FIG. 8 illustrates a dialogue window generated during implementation of the Pan-Zoom-Rotate command.

Referring first to FIG. 8, after a user has selected a particular clip 106 from, for example, the Storyboard View 72, that clip may be modified by implementing the Pan-Zoom-Rotate command as described above. Once the command is selected, the Pan-Zoom-Rotate dialogue window is displayed by the system. The Begin Time (first frame) and End Time (last frame) displays 152, 154 initially include cross hairs identifying the origin and the X and Y axes in space along with a four-quadrant perspective grids 156, 158 representing the orientation or size of the beginning and ending frames. Each of the four quadrants of the perspective grids 156 and 158 are preferably different colored lines such as, for example, a green X first quadrant, a yellow X second quadrant, a red X third quadrant, and a blue X fourth quadrant. It should be noted that the third (red) quadrant of the grids 156, 158 do not appear in FIG. 8 (or FIG. 14) because red reproduces in black and white as black. By color coding the icons, the user can quickly appreciate the degree of rotation and orientation of the frame in three-space.

Referring again to FIG. 8, the first frame has been rotated about the X axis by selecting X in the Begin Time rotation box 160 and either typing in the angle of rotation (55 degrees) in a numerical box or clicking on the ball of the thumbwheel 162 and rotating the ball to the desired position on the wheel, for example, at about 163, and releasing the button on the mouse 46. The grid 156 in the Begin Time display 152 rotates as the thumbwheel ball 162 is moved about the circle (or as the desired number of degrees of rotation is entered in the appropriate numerical box). Likewise, the grid 156 expands or contracts in size as the zoom slider 164 is positioned.

In the example shown in FIG. 8, the zoom slider 164 is positioned to slightly reduce the frame to eight tenths of its original area. While the zoom slider 166 for the End Time frame is positioned at normal size. It should be noted that, this conventional slider may be positioned to simultaneously and identically adjust the zoom values of the Begin Time and End Time frames to the same value by positioning the center slider 168. Positioning bars 170 and 172 may be activated in a conventional manner to position the Begin Time frame (as illustrated by the four quadrant grid 156) in the X and Y axes, respectively. The center of the frame in the example shown in the FIG. 8 has been moved to the right (+X) and up (−Y) from the origin. Rotation of the four quadrant grid 158 representing the end frame of the clip can be accomplished by manipulating the rotation controls in the corresponding End Time rotation box 174 as well as by translating the frame relative to the origin using sliders 178 and 180. The rotation order box 182 may be set with the desired order of axial rotation.

Once the desired Begin Time and End Time sizes and positions are established, the user can view an animation of the Pan-Zoom-Rotate effect by clicking on the Animate box 184. The grid 156 in the Begin Time display 152 will then move from its Begin Time size and position to the End Time size and position, thereby dynamically displaying the defined Pan-Zoom-Rotate action in abstract form.

Figure 9:
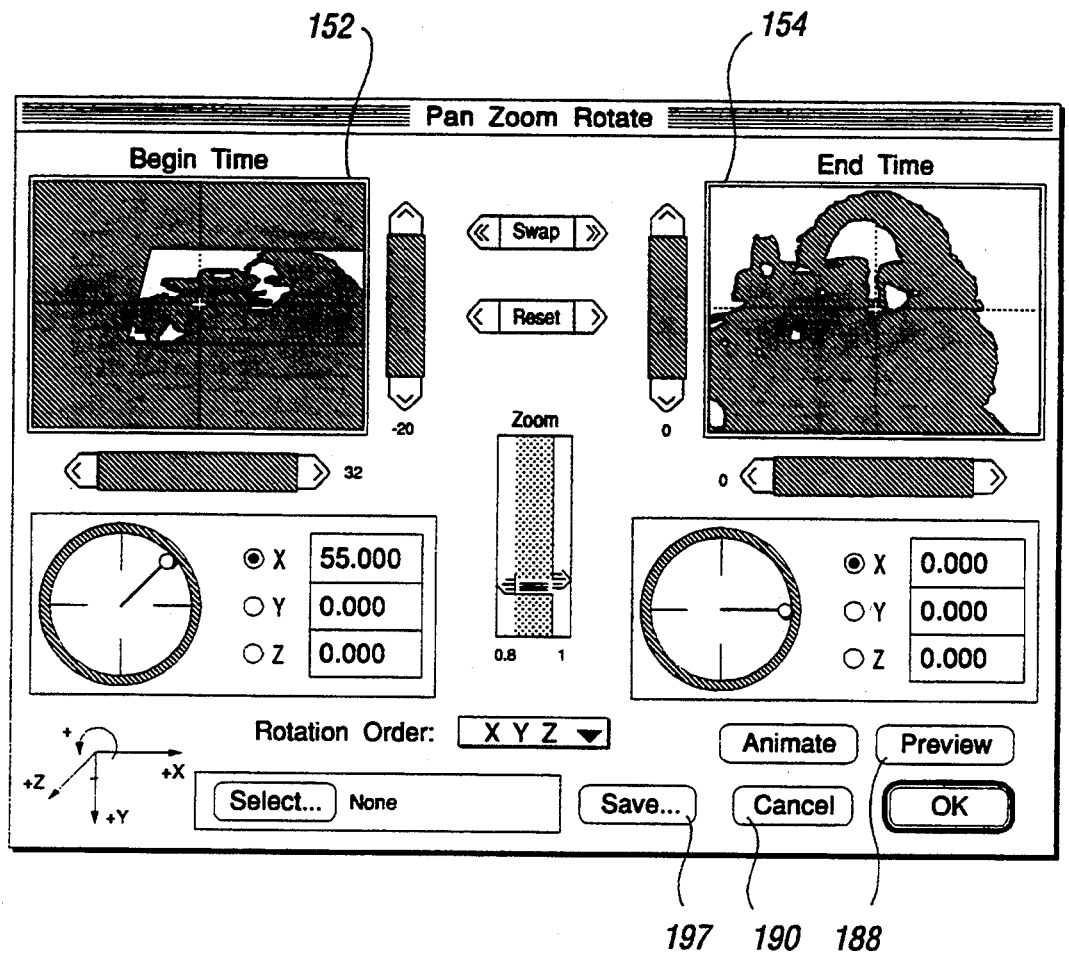
FIG. 9 illustrates a dialogue window including a begin and end frame preview of a Pan-Zoom-Rotate operation on a selected clip.

Referring to FIG. 9, if the defined action still appears desirable, the user may preview the clip by clicking on the Preview window 188. The system then previews the Begin Time and End Time appearance of the clip by generating the first frame image in the Begin Time display window 152 and displaying the last frame image in the End Time display window 154. If the operation is not desired, the operation can be canceled by activating the cancel button 190.

Figure 10:
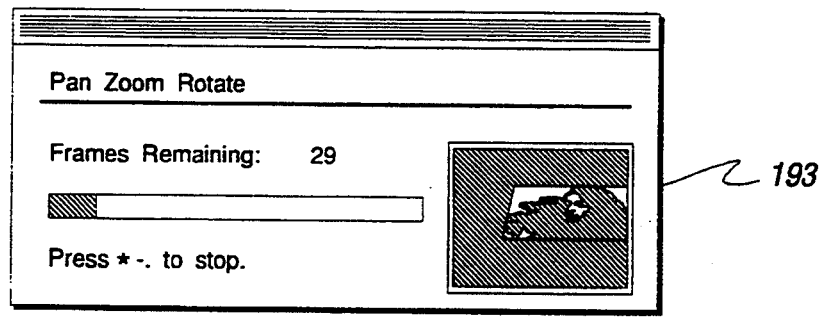
FIG. 10 illustrates a processing window for the Pan-Zoom-Rotate command.

If the operation is desired, the OK button 192 is activated, and the system displays a status window 193, shown in FIG. 10, which tracks the frame-by-frame processing of the clip through the defined action. In addition, the status window display 194 displays each frame as it is processed.

As with all operations defined with Begin Time and End Time parameters that are non-identical, the system interpolates the parameters for all of the intervening frames the clip so processes. In the preferred embodiment, this interpolation is linear and continuous with the defined parameters being set for the first frame (Begin Time) and last frame (End Time) of a clip. However, the system could also be designed to allow for specific parameter programming of additional key frames, with linear interpolation of each of the intervening frames between each of the defined key frames. In addition to this alternative discontinuous linear interpolation, other forms of interpolation may be provided without departing from the spirit of the invention.

It will, thus, be appreciated by those skilled in the ark that the system of the present invention provides key frame based dynamic filters by interpolating the process parameters for the filtering operations on each of the intervening frames between the key frame, thereby creating powerful special effects. Pan-Zoom-Rotate, and other Filter commands, generally have parameters that can be set to change the way they operate on an image. Since movies have many frames of images, it would be powerful to be able to set the parameters on a filter and process each image (frame) individually. However, such precise control would be tedious and time consuming. By providing a limited number of key frames for each clip for which parameters must be established, and interpolating those parameters for intervening frames, dynamic filtering is achieved without the tedium of frame-by-frame programming. This concept of interpolation is utilized in the system wherever a continuous parameter exists that can be interpolated.

Figure 11:
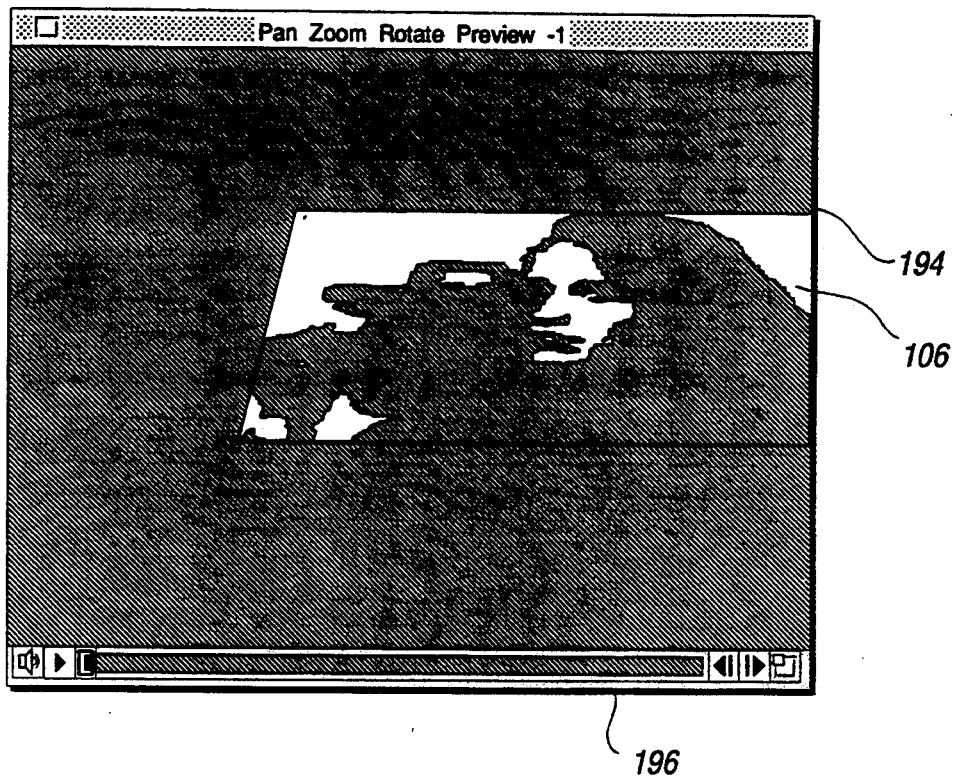
FIG. 11 illustrates a clip preview window.

Referring now to FIG. 11, upon completion of the Pan-Zoom-Rotate process, a Pan-Zoom-Rotate preview window 194 is displayed showing the first frame (at Begin Time) of the clip 106. By activating the controls on the controller bar 196 in a manner similar to the movie controller 80 on the Player View window 70, the processed clip 106 can be played. If desired, the clip can be saved as a part of the movie by executing the appropriate commands, such as, for example, by clicking on the clip 106 in the preview display window 194, dragging the clip to the Storyboard, and pasting it in the desired location on the Storyboard.

Figure 12:
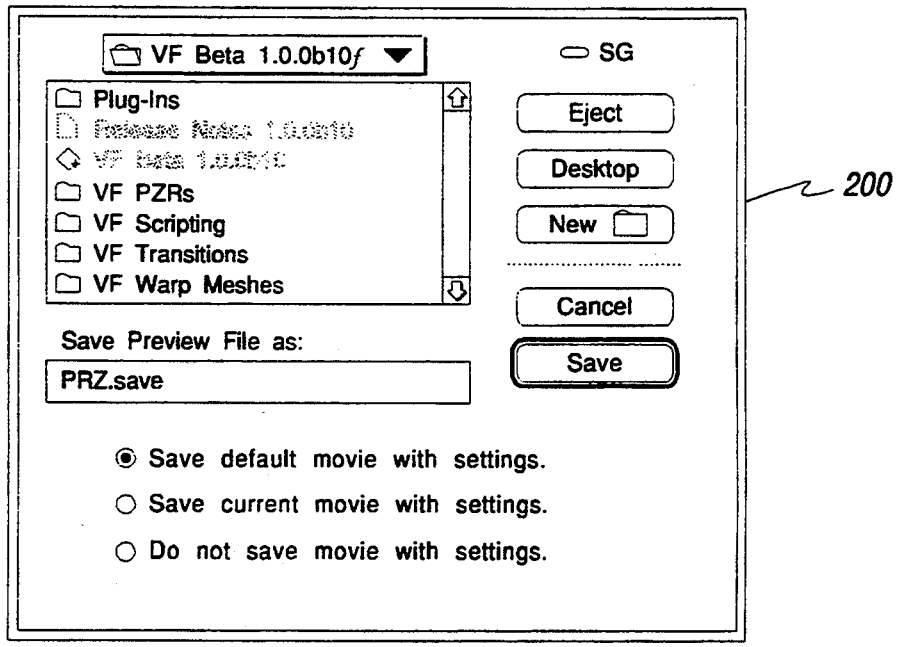
FIG. 12 illustrates a save window generated during implementation of the Pan-Zoom-Rotate command.

Referring to FIGS. 9 and 12, any defined parameters can be saved for future use by hitting the save button 197 in the Pan-Zoom-Rotate window 150. The save window 200 is then displayed, allowing the user to execute any one of the conventional file manipulation options.

Figure 13:
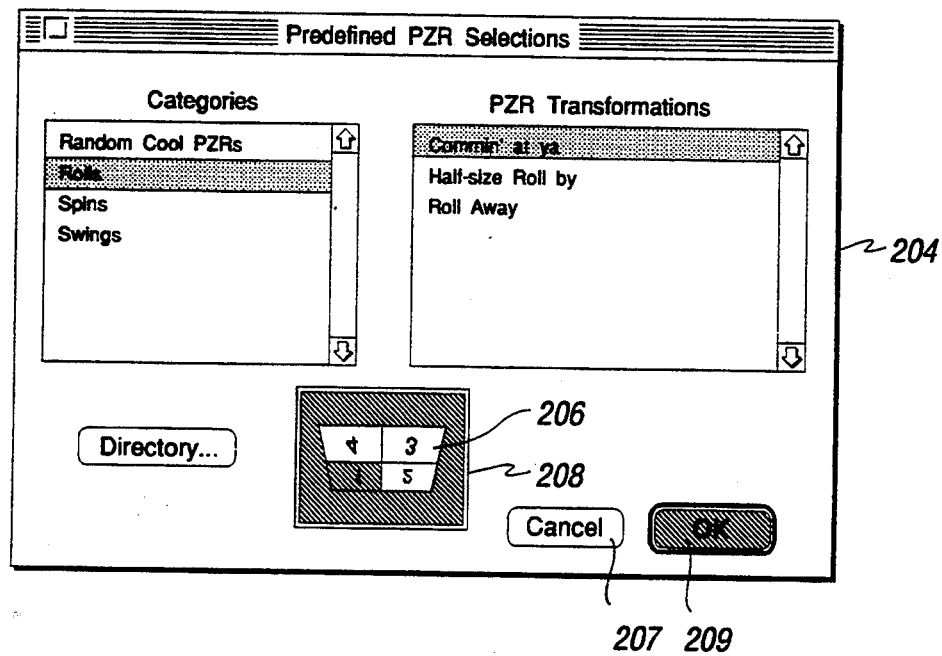
FIG. 13 illustrates a window including an animated view of a selected stored Pan-Zoom-Rotate operation.
Figure 14:
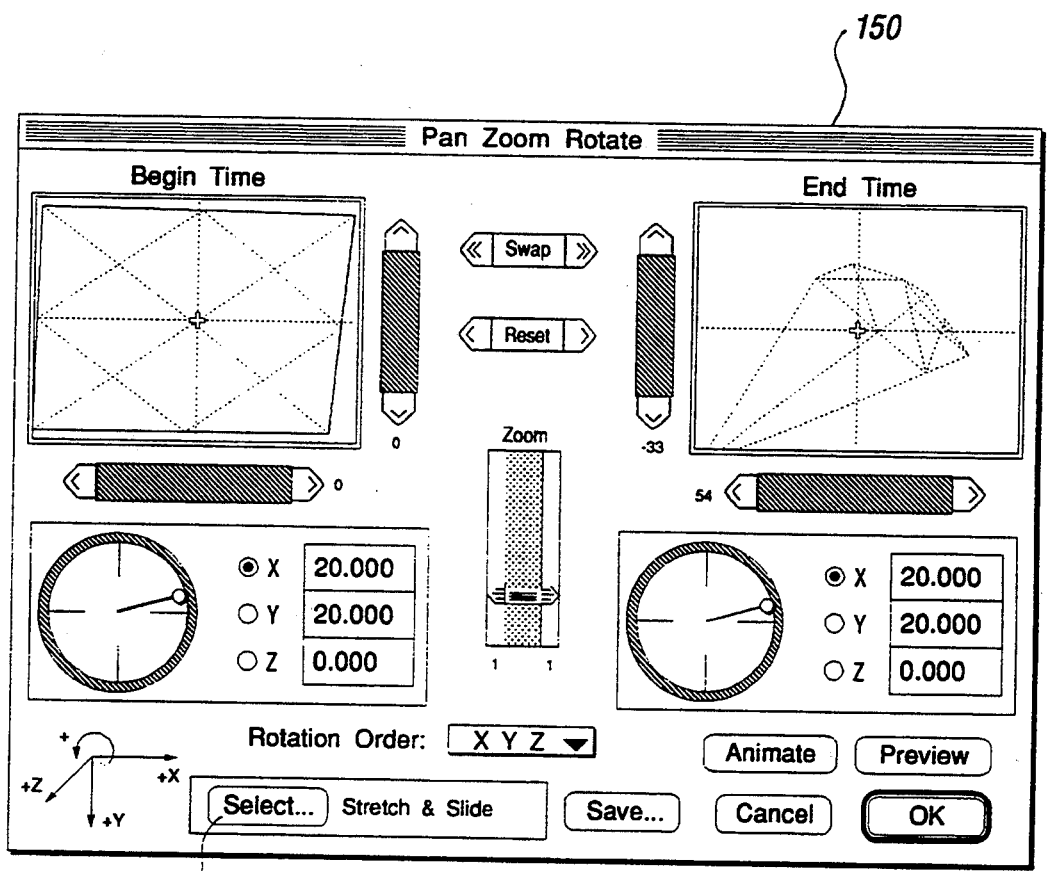
FIG. 14 illustrates another dialogue window for a Pan-Zoom-Rotate command.

It will be appreciated by those skilled in the art that the save option allows for creation of a custom special effects library which can be recalled with a click of the mouse 46. As shown in FIGS. 13 and 14, by clicking the mouse 46 on the select button 202, a directory of predefined Pan-Zoom-Rotate parameters, including any defined by the user, may be accessed and utilized for any selected clip. A window of predefined Pan-Zoom-Rotate selections 204 is displayed. The user may select from amongst defined categories or particular transformations. When a selection is made, a four-color, four-quadrant grid 206 (the red quadrant reproduced as black) provides an animated movie at 208 of the selected Pan-Zoom-Rotate action. The user can either select from a different category or different specific Pan-Zoom-Rotate transformation, cancel the window altogether by clicking on the cancel button at 207 or select the chosen transformation by clicking on OK at 209. The predefined parameters are then loaded by the system in the Pan-Zoom-Rotate dialogue window 150. Referring to FIG. 14, the predefined "Stretch & Slide" operation has been chosen. Note the Begin Time and End Time parameters are displayed for the selected action.

Figure 15:
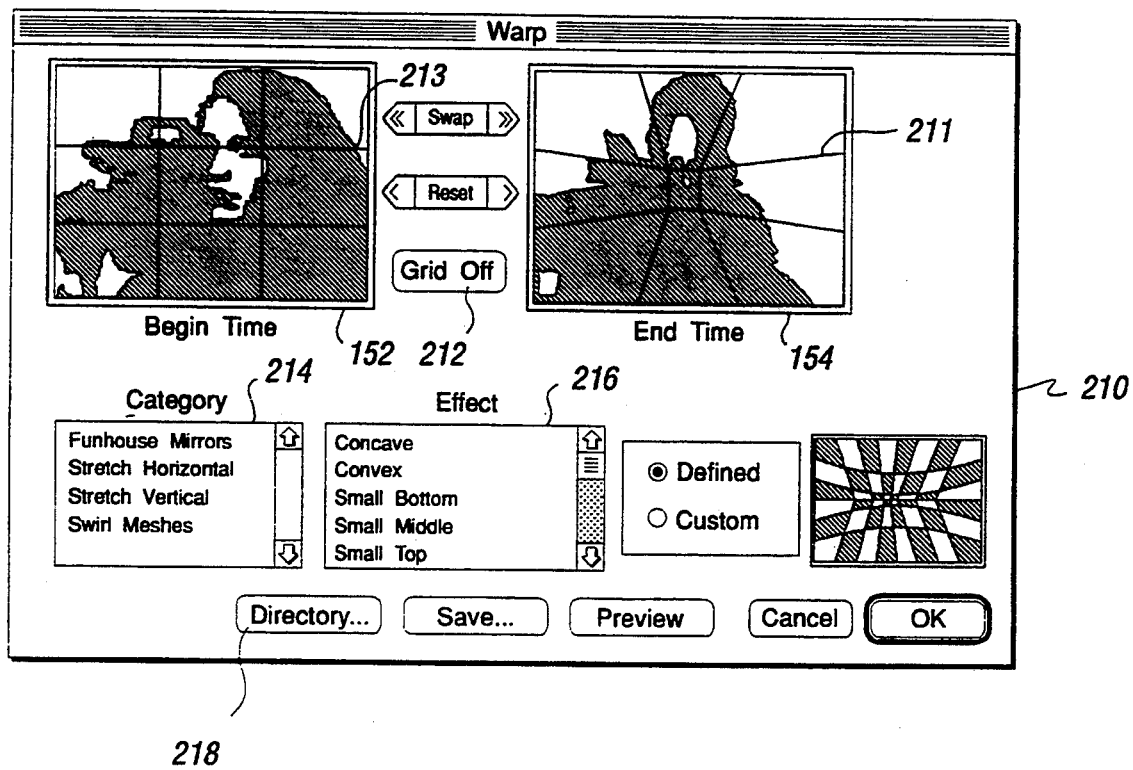
FIG. 15 illustrates dialogue window for the Warp command.

Referring now to FIG. 15, the implementation of the Warp command by, for example, selecting a particular clip 106 from the Storyboard View window 72, results in the display of the warp window dialogue 210. The first frame of the selected clip is displayed in the Begin Time window 152 and the last frame of the selected clip is displayed in the End Time window 154. A grid 211 may be superimposed on the Begin Time window 152 and the End Time window 154 by activating the grid button 212 (which toggles between "grid off" and "grid on". Varying grid sizes are also provided so that the control points can be placed directly over the area of the movie that you wish to warp. To create a custom warp, the user simply activates the Custom button, then clicks and drags any control point on the grids 211, 213 to the desired location. The portion of the frame under this control point will be stretched to this new location.

As with all commands that have different Begin Time and End Time parameters, the position of each of the control points will be interpolated for each of the intervening frames in the clip between the Begin Time frame and the End Time frame to create a Time varying warp. As with Pan-Zoom-Rotate, the system also provides a set of defined warp effects which may be selected from the category box 214 and the effect box 216, or alternatively by clicking on the directory button 218 which will prompt the system to generate a directory window (not shown) including a display of predefined warp effects. Once selected, the system utilizes the stored parameters for the Begin Time frame and the End Time frame and displays the first frame of the clip in the Begin Time window 152 and the last frame of the clip in the End Time window 154, each altered as prescribed by the selected warp effect. In addition, an animated icon 220 displays the defined effect.

As with the Pan-Zoom-Rotate command, custom defined effects can be saved, thereby allowing the user to create his/her own library for quick recall for future use.

It will be appreciated by those skilled in the art that, although the warp effect only warps the image in two dimensions, three dimensional warps may be simulated by careful adjustment of the control points on the grids 211, 213.

Similar command windows are provided for each of the frame/clip editing commands supported by the system. It will be appreciated by those skilled in the art that, where useful, predefined effects can be provided and implemented for other commands. In the preferred embodiment, such predefined, and user definable, effects are provided in a manner similar to that described above in connection with the Pan-Zoom-Rotate and Warp commands for the Transition, Pallet and Convolve commands. It will be appreciated that similar predefined and user defined parameters can be implemented for other commands utilizing the above described interfaces.

The command windows for other commands also similarly provide an opportunity to preview the effect of a selected command on the first frame and last of a selected clip, as well as the use of animated icons to demonstrate predefined effects where appropriate. Also, each command is typically implemented for a selected clip by activating an OK button in the command window.

It will be appreciated by those skilled in the art that the interface for any effect implemented by the system can include any one or more of the features described and shown in connection with FIGS. 8–14. The display of these various command windows to prompt the input of particular parameters for a selected command and a selected clip, and to preview the result for that clip provide a powerful and efficient movie editing tool, particularly when used in conjunction with the various movie views provided by the present invention.

While the best mode for carrying out the invention has been described in detail, those familiar with the art to which this invention relates will recognize various alternative designs and embodiments for practicing the invention as disclosed by the following claims.

What is claimed is:

1. A system for processing digital movies including:
  a general purpose computer having
    a microprocessor,
    random access memory operably connected to the microprocessor, and
  storage memory operably connected to the microprocessor;
  display means operably connected to the microprocessor, the display means including a plurality of view windows, each providing a display of a selected portion of a movie, each of the view windows having a different format, and wherein one of the view windows is a storyboard view wherein the window comprises a selectable portion of a two-dimensional array of sub-windows, and where each sub-window is capable of displaying a video image corresponding to a preselected portion of the movie; and
  input means for selecting one of the plurality of movie view windows to play a selected portion of the movie therein.

2. The system of claim 1 wherein one of the view windows is a play view which comprises in substantial portion a generally rectangular area defining a single viewing screen in which a selected portion of a movie can be played in response to commands provided through the input means.

3. The system of claim 1 wherein the view windows include a time view which displays a selected movie in a plurality of sequential sub-windows, with each sub-window capable of displaying a selected portion of the movie.

4. The system of claim 1 wherein the view windows include a script view comprising in substantial part an area defining a text processing area into which the text of a script corresponding to at least one portion of a selected movie can be displayed for editing.

5. The system of claim 1 further including a secondary storyboard view window comprising a selectable portion of an array of sub-windows, each sub-window being capable of displaying a video image corresponding to a preselected portion of the movie;

logic means for correlating the video images in the secondary storyboard view window with one of the selected sub-windows in the storyboard view window, and second input means for activating the storyboard view window, selecting a sub-window therein, and thereafter selecting the secondary storyboard view window, whereby the video images displayed in the secondary storyboard view window are input movies which, when suitably processed, yield the portion of the movie in the selected sub-window of the storyboard view window.

6. The system of claim 1 wherein the preselected portions of the movies displayed in the sub-windows of the storyboard window are each clips comprising a plurality of frames of digital video images.

7. The system of claim 6 including logic means for selecting any one of the clips contained in any one selected sub-window of the storyboard view and playing the clip within the sub-window.

8. The system of claim 6 further including:
input means for selecting at least one of the plurality of sub-windows; and
first logic means for implementing selected processing operations on the selected clips in response to commands provided through the input means.

9. The system of claim 8 wherein the processing operation is a digital image processing operation.

10. A system for processing digital movies including:
a general purpose computer having:
a microprocessor,
random access memory operably connected to the microprocessor,
storage memory operably connected to the microprocessor; and
display means including a time view window which displays a selected portion of a movie in a plurality of sequential sub-windows, with each sub-window capable of displaying a selected portion of the movie, and wherein the selected portion of the movie displayed in each sub-window is a clip comprising a sequence of frames of a digital video image, and further including means for defining a new clip by selecting a plurality of sub-windows, with the first frame of the new clip being the first frame of the clip in the first selected sub-window and the last frame of the new clip being the last frame of the clip in the last selected sub-window.

11. The system of claim 10 wherein the time view window further includes a two-dimensional array of sub-windows, in which the first row of sub-windows displays a selected portion of a movie, with each sub-window capable of displaying a selected sub-portion of the selected portion of the movie, and wherein the remaining sub-windows in any column each display portions of movies corresponding to the inputs to image processing operations that produced the sub-portion of the movie displayed in the sub-window in the first row of that column.

12. A system for processing digital movies including:
a general purpose computer having:
a microprocessor,
random access memory operably connected to the microprocessor,
storage memory operably connected to the microprocessor;
display means including a plurality of view windows, each of the view windows having a different format, wherein one of the view windows is a script view window comprising in substantial part an area defining a text processing area into which the text of a script corresponding to at least one portion of a selected movie can be displayed for editing, and wherein at least one other of the view windows provides a display of a selected portion of a movie;
logic means for correlating the video images in one of the other view windows with the script displayed in the script view window; and
input means for activating one of the other view windows, selecting a portion of a selected movie to be displayed therein, and thereafter selecting the script view window, whereby the portion of the script then displayed corresponds to the portion of the movie selected in the other view window.

13. The system of claim 12 further including:
a storyboard view window comprising a selectable portion of an array of sub-windows, and where each sub-window is capable of displaying a video image corresponding to a preselected portion of the movie;
logic means for correlating the video images in the sub-windows of the storyboard view with the script displayed in the script view, and
input means for activating the storyboard view window, selecting a sub-window therein, and thereafter selecting the script view window, whereby the portion of the script then displayed corresponds to the portion of the movie selected in the selected sub-window of the storyboard view window.

14. The system of claim 13 wherein the storyboard view window is a two-dimensional array of sub-windows with each row of sub-windows corresponding to a scene of the movie, and wherein the video images in the sub-windows of the storyboard view are correlated by scene with the script displayed in the script view.

15. A system for processing digital movies including:
a general purpose computer having:
a microprocessor,
random access memory operably connected to the microprocessor, and
storage memory operably connected to the microprocessor; and
a display including a plurality of view windows, each providing a display of a movie, each of the view windows having a different format,
means for selecting a first one of the plurality of movie view windows and selecting a portion of the movie displayed in the selected window,
means for selecting a second one of the movie view windows including logic means for activating the second movie view window with the portion of the movie selected in the first selected movie view window.

16. A system for processing digital movies including:
a general purpose computer having:
a microprocessor,
random access memory operably connected to the microprocessor,
storage memory operably connected to the microprocessor;
display means including a plurality of view windows, each of the view windows having a different format, wherein one of the view windows is a script view window comprising in substantial part an area defining a text processing area into which the text of a script corresponding to at least one portion of a selected movie can be displayed for editing, and wherein at least one other of the view windows provides a display of a selected portion of a selected movie;

logic means for correlating the video images in one of the other view windows with the script displayed in the script view window; and input means for activating the script view window, selecting a portion of the script to be displayed therein, and thereafter selecting one of the other view windows, whereby the portion of the movie then displayed corresponds to the portion of the script selected in the script view window.

* * * * *

UNITED STATES PATENT AND TRADEMARK OFFICE
CERTIFICATE OF CORRECTION

PATENT NO. : 5,404,316
DATED : April 4, 1995
INVENTOR(S) : Klingler, et. al.

It is certified that error appears in the above-indentified patent and that said Letters Patent is hereby corrected as shown below:

Column 7, line 15, after "includes a " delete "two dimensional" and insert therefor--two-dimensional--.

Column 8, line 34, after "selected" delete "Window" and insert therefor--window--.

Column 16, line 21, after "in the" delete "ark" and insert therefor--art--.

Signed and Sealed this

Twenty-first Day of November, 1995

BRUCE LEHMAN

*Attest:*

*Attesting Officer*        *Commissioner of Patents and Trademarks*